United States Patent
Tirumala et al.

(10) Patent No.: US 10,877,757 B2
(45) Date of Patent: Dec. 29, 2020

(54) BINDING CONSTANTS AT RUNTIME FOR IMPROVED RESOURCE UTILIZATION

(71) Applicant: NVIDIA CORPORATION, Santa Clara, CA (US)

(72) Inventors: Ajay Tirumala, Cupertino, CA (US); Jack Choquette, Palo Alto, CA (US); Manan Patel, San Jose, CA (US); Shirish Gadre, Fremont, CA (US); Praveen Kaushik, Bengaluru (IN); Amanpreet Grewal, Thornhill (CA); Shekhar Divekar, Pune (IN); Andrei Khodakovsky, San Carlos, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 15/897,090

(22) Filed: Feb. 14, 2018

(65) Prior Publication Data

US 2019/0146817 A1     May 16, 2019

Related U.S. Application Data

(60) Provisional application No. 62/586,031, filed on Nov. 14, 2017.

(51) Int. Cl.
*G06F 9/44* (2018.01)
*G06F 9/445* (2018.01)
(Continued)

(52) U.S. Cl.
CPC .......... *G06F 9/30141* (2013.01); *G06F 8/427* (2013.01); *G06F 8/434* (2013.01);
(Continued)

(58) Field of Classification Search
CPC ...... G06F 9/45516; G06F 8/427; G06F 8/434; G06F 9/3836; G06F 9/30141; G06F 9/4881; G06F 8/443
See application file for complete search history.

(56) References Cited

U.S. PATENT DOCUMENTS

| 8,732,671 | B2* | 5/2014 | Pedersen ................. G06F 8/443 717/128 |
| 2008/0082788 | A1* | 4/2008 | Veidenbaum ......... G06F 9/3836 712/23 |

(Continued)

OTHER PUBLICATIONS

Sagi Shahar, ActivePointers: A Case for Software Address Translation on GPUs, 2016, pp. 1-13. https://ieeexplore.ieee.org/stamp/stamp.jsp?tp=&arnumber=7551425 (Year: 2016).*

(Continued)

*Primary Examiner* — Mongbao Nguyen
(74) *Attorney, Agent, or Firm* — Artegis Law Group, LLP

(57) ABSTRACT

A just-in-time (JIT) compiler binds constants to specific memory locations at runtime. The JIT compiler parses program code derived from a multithreaded application and identifies an instruction that references a uniform constant. The JIT compiler then determines a chain of pointers that originates within a root table specified in the multithreaded application and terminates at the uniform constant. The JIT compiler generates additional instructions for traversing the chain of pointers and inserts these instructions into the program code. A parallel processor executes this compiled code and, in doing so, causes a thread to traverse the chain of pointers and bind the uniform constant to a uniform register at runtime. Each thread in a group of threads executing on the parallel processor may then access the uniform constant.

20 Claims, 8 Drawing Sheets

(51) Int. Cl.
*G06F 9/30* (2018.01)
*G06F 8/41* (2018.01)
*G06F 9/48* (2006.01)
*G06F 9/38* (2018.01)
*G06F 9/455* (2018.01)

(52) U.S. Cl.
CPC ............ *G06F 8/443* (2013.01); *G06F 9/3836* (2013.01); *G06F 9/45516* (2013.01); *G06F 9/4881* (2013.01)

(56) References Cited

U.S. PATENT DOCUMENTS

| | | | |
|---|---|---|---|
| 2010/0299499 A1* | 11/2010 | Golla | G06F 9/3851 712/206 |
| 2011/0283096 A1* | 11/2011 | Abernathy | G06F 9/30138 712/245 |
| 2012/0023295 A1* | 1/2012 | Nemawarkar | H04L 49/00 711/130 |
| 2012/0254497 A1* | 10/2012 | Ni | G06F 15/167 711/6 |
| 2013/0113809 A1* | 5/2013 | Kong | G06F 8/443 345/505 |
| 2013/0232322 A1* | 9/2013 | Fetterman | G06F 9/3887 712/225 |
| 2013/0268715 A1* | 10/2013 | Fetterman | G06F 9/3887 711/5 |
| 2013/0318514 A1* | 11/2013 | Neeman | G06F 8/65 717/168 |
| 2014/0157291 A1* | 6/2014 | Adams | G06F 9/44521 719/331 |
| 2014/0165072 A1* | 6/2014 | Wang | G06F 9/5016 718/104 |
| 2014/0215187 A1* | 7/2014 | Yazdani | G06F 8/445 712/206 |
| 2014/0281357 A1* | 9/2014 | Duluk, Jr. | G06F 11/073 711/206 |
| 2015/0067658 A1* | 3/2015 | Hahnenberg | G06F 8/4443 717/148 |
| 2015/0309813 A1* | 10/2015 | Patel | G06F 8/75 703/22 |
| 2016/0019066 A1* | 1/2016 | Diamos | G06F 9/30087 712/228 |
| 2016/0378679 A1* | 12/2016 | Cintra | G06F 12/1009 711/206 |
| 2017/0031599 A1* | 2/2017 | Bowman | G06F 3/061 |
| 2017/0046154 A1* | 2/2017 | Krishna | G06F 9/3838 |
| 2017/0090925 A1* | 3/2017 | O'Connor | G06F 9/3877 |
| 2017/0116108 A1* | 4/2017 | Miskelly | G06F 11/3624 |
| 2017/0262174 A1* | 9/2017 | Newburn | G06F 9/4881 |
| 2018/0157493 A1* | 6/2018 | Steiss | G06F 9/3861 |
| 2018/0356964 A1* | 12/2018 | Morris | G06F 3/04815 |
| 2020/0111454 A1* | 4/2020 | Ray | G06F 9/461 |

OTHER PUBLICATIONS

Julian Shun, Shared-Memory Parallelism can be simple, fast, and Scalable, Jun. 2017, pp. 1-444. https://dl.acm.org/doi/book/10.1145/3018787 (Year: 2017).*

Hiroaki Hirata, Speculative Memory: An Architectural Support for Explicit Speculations in Multithreaded Programming, 2016, pp. 1-7. https://ieeexplore.ieee.org/stamp/stamp.jsp?arnumber=7550843 (Year: 2016).*

Reshmi Mitra, Performance Modeling of Shared Memory Multiple Issue Multicore Machines, 2012, pp. 464-473. https://ieeexplore.ieee.org/stamp/stamp.jsp?tp=&arnunnber=6337514&isnumber=6337459 (Year: 2012).*

Lee, Yunsup, "Decoupled Vector-Fetch Architecture with a Scalarizing Compiler", Electrical Engineering and Computer Sciences, University of California at Berkeley, http://www.eecs.berkeley.edu/Pubs/TechRpts/2016/EECS-2016-117.html, May 24, 2016, pp. 1-159.

Lee et al., "Convergence and Scalarization for Data-Parallel Architectures", CGO '13: Proceedings of the 2013 IEEE/ACM International Symposium on Code Generation and Optimization (CGO), Feb. 23-27, 2013, 11 pages.

GPU Ocelot, "A Dynamic Compilation Framework for GPU Computing", http://gpuocelot.gatech.edu/, Sep. 8, 2014, 2 pages.

"Direct3D 12 graphics—Win32 apps", Microsoft Docs, https://docs.microsoft.com/en-in/windows/win32/direct3d12/direct3d-12-graphics?redirectedfrom=MSDN, Nov. 27, 2018, 1 page.

* cited by examiner

BINDING CONSTANTS AT RUNTIME FOR IMPROVED RESOURCE UTILIZATION

CROSS-REFERENCE TO RELATED APPLICATIONS

This application claims priority benefit of the U.S. Provisional Patent Application titled, "Uniform Datapath for Improved Resource Utilization," filed on Nov. 14, 2017 and having Ser. No. 62/586,031. The subject matter of this related application is hereby incorporated herein by reference.

BACKGROUND OF THE INVENTION

Field of the Invention

Embodiments of the present invention relate generally to multithreaded processing and, more specifically, to binding constants at runtime for improved resource utilization.

Description of the Related Art

A conventional multithreaded application may execute on a parallel processor. In such implementations, multiple threads typically execute portions of the multithreaded application in parallel with one another to perform various computations. For example, each thread in a set of threads could simultaneously execute a pixel shader stage of a graphics processing pipeline to compute color values for pixels when rendering a graphics scene.

During execution, threads oftentimes perform their respective computations based on one or more constants. A constant is typically a floating point or integer value that does not change over the lifetime of the application. For example, a given constant could define the reflectivity of a particular material that resides within a graphics scene. The values of these constants are usually stored in a constant bank. In operation, a set of threads executing portions of the multithreaded application accesses the constant bank in order to perform computations. such as those mentioned above. For example, when rendering a graphics scene that includes a material having a given reflectivity value, each thread in the set of threads would read that reflectivity value from the constant bank. Then, each thread would generate color values for one or more pixels based on the reflectivity value.

A conventional parallel processor usually has a limited number of constant banks (fourteen in some implementations) and, therefore, can only store a fixed number of constant values. Thus, a multithreaded application executing on a conventional parallel processor is typically constrained to performing computations based only on that fixed number of constant values. This constraint has certain drawbacks. In particular, certain standard application programming interfaces (APIs) require that multithreaded applications have access to a far greater number of constants than can be stored by the limited number of constant banks included in a conventional parallel processor. Without providing access to a greater number of constants, a conventional parallel processor can only achieve partial compliance with these standard APIs. A parallel processor that only partially complies with standard APIs risks not being considered an acceptable platform for developing multithreaded applications within the industry.

As the foregoing illustrates, what is needed in the art are more effective techniques for storing and accessing constants when executing a multithreaded application.

SUMMARY OF THE PRESENT INVENTION

One embodiment of the present invention sets forth a computer-implemented method for binding constants, including determining a first pointer chain based on a first instruction included in a multithreaded application, where the first pointer chain indicates a first memory location associated with a first constant, generating a set of additional instructions based on the first pointer chain, causing a first thread included in a first set of threads to execute the set of additional instructions, where the first thread copies the first constant to a second memory location when executing the set of additional instructions, and causing each thread included in the first set of threads to execute a second instruction, where each thread included in the first set of threads performs a first operation using the first constant when executing the second instruction.

One advantage of the disclosed approach is that the multithreaded application may reference a number of constant values that is not limited by the storage capacity of dedicated constant banks. Accordingly, a parallel processor that implements this approach may be fully compliant with Tier 3 of the DX12 API.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

As noted above, a conventional parallel processor has a limited number of constant banks and, thus, can only store a fixed number of constant values. Consequently, a conventional multithreaded application executing on such a processor cannot perform computations with more than that fixed number of constant values. Without providing access to a greater number of constants, a conventional parallel processor can only achieve limited compliance with industry standard APIs and, more specifically, cannot comply with Tier 3 of the DirectX 12 (DX12) API. Parallel processors that are not Tier 3 compliant with DX12 may not be considered an acceptable platform for developing multithreaded applications.

To address this problem, embodiments of the invention include a just-in-time (JIT) compiler configured to bind constants at runtime. The JIT compiler parses program code derived from the multithreaded application and identifies an instruction that references a uniform constant. The JIT compiler then determines a chain of pointers that originates within a root table specified in the multithreaded application and terminates at the uniform constant. The JIT compiler generates additional instructions for traversing the chain of pointers and inserts these instructions into the program code. A parallel processor executes this compiled code and, in doing so, traverses the chain of pointers to bind the uniform constant to a uniform register at runtime. Each thread in a group of threads executing on the parallel processor may then access the uniform constant.

One advantage of this approach is that the multithreaded application may reference a number of constant values that is limited only by the amount of available heap memory and not limited by the storage capacity of constant banks. Accordingly, a parallel processor that implements this approach may be fully compliant with Tier 3 of the DX12 API. Because compliance with industry standard APIs is critical to the success of a parallel processor, the approach disclosed herein represents a significant technological improvement over conventional techniques that cannot provide such compliance.

System Overview

Figure 1:
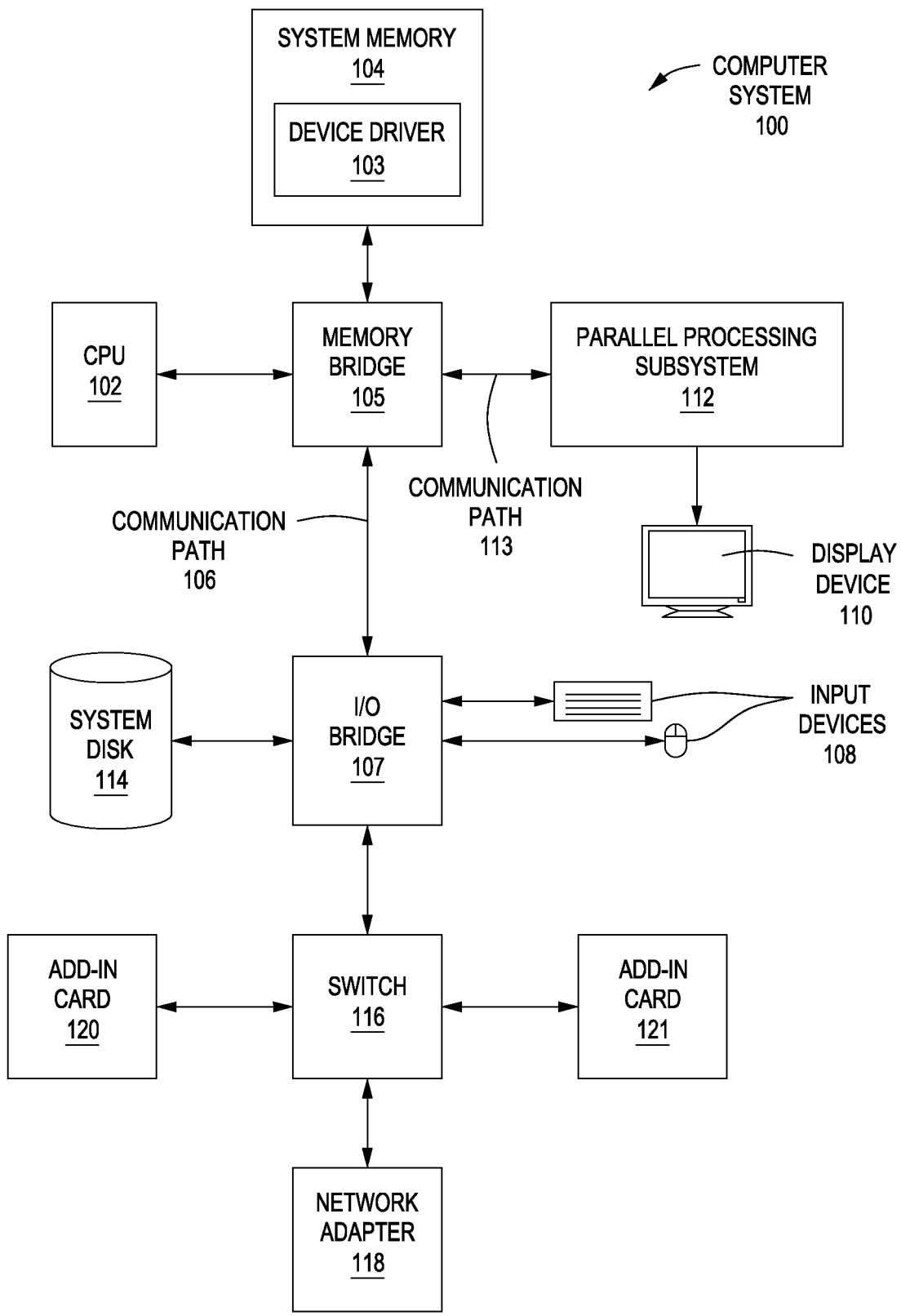
FIG. 1 is a block diagram of a computer system configured to implement one or more aspects of the present invention.

FIG. 1 is a block diagram of a computer system 100 configured to implement one or more aspects of the present invention. Broadly speaking, computer system 100 may be any system that includes a memory, a parallel processing unit or graphics processing unit, and a central processing unit. As shown, however, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112. Device driver 103 may include one or more compilers configured to compile application-level instructions into machine-level instructions, as described in greater detail below in conjunction with FIG. 4.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
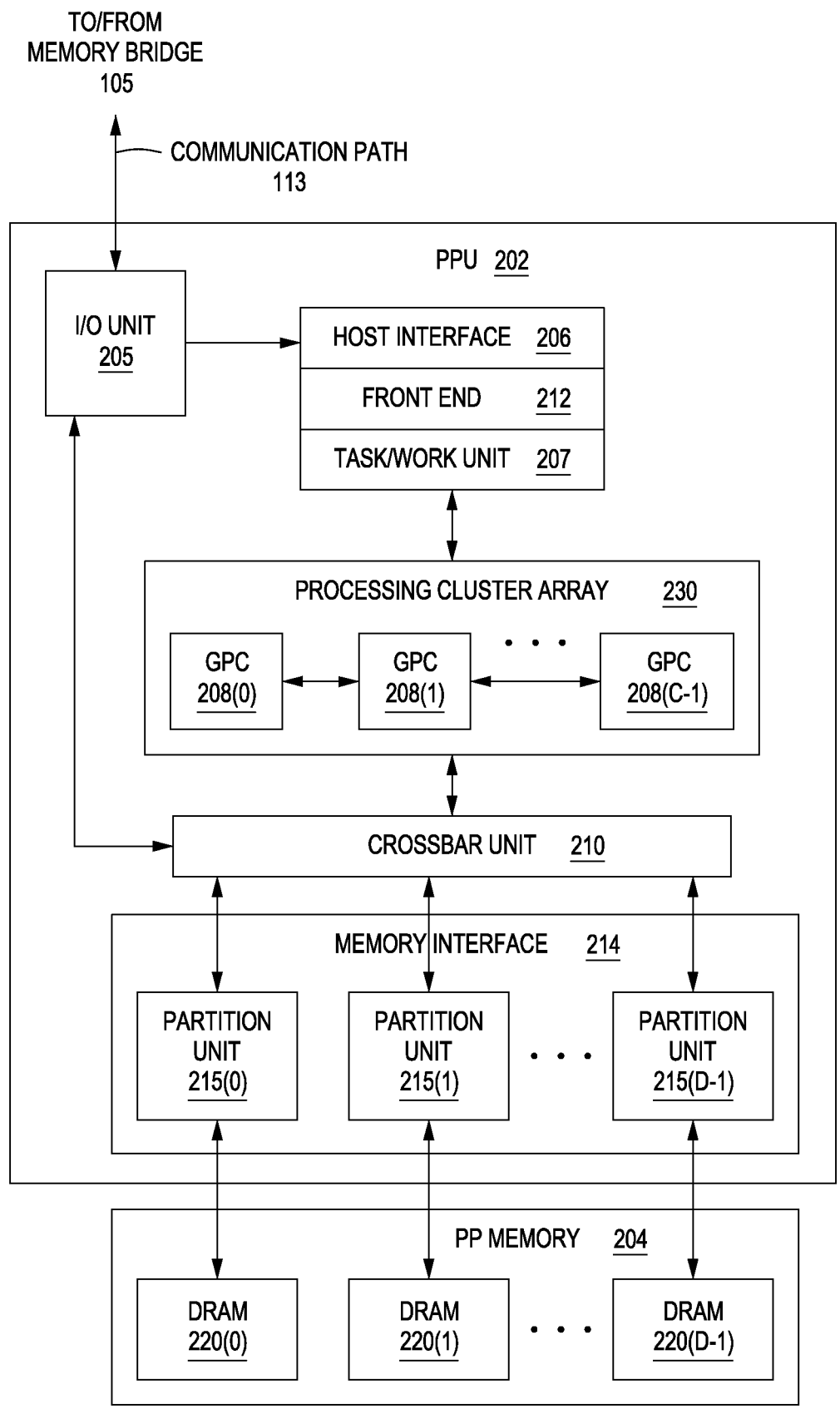
FIG. 2 is a block diagram of a parallel processing unit included in the parallel processing subsystem of FIG. 1, according to various embodiments of the present invention.

FIG. 2 is a block diagram of a parallel processing unit (PPU) 202 included in the parallel processing subsystem 112 of FIG. 1, according to various embodiments of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where D□1. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPCs 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3A:
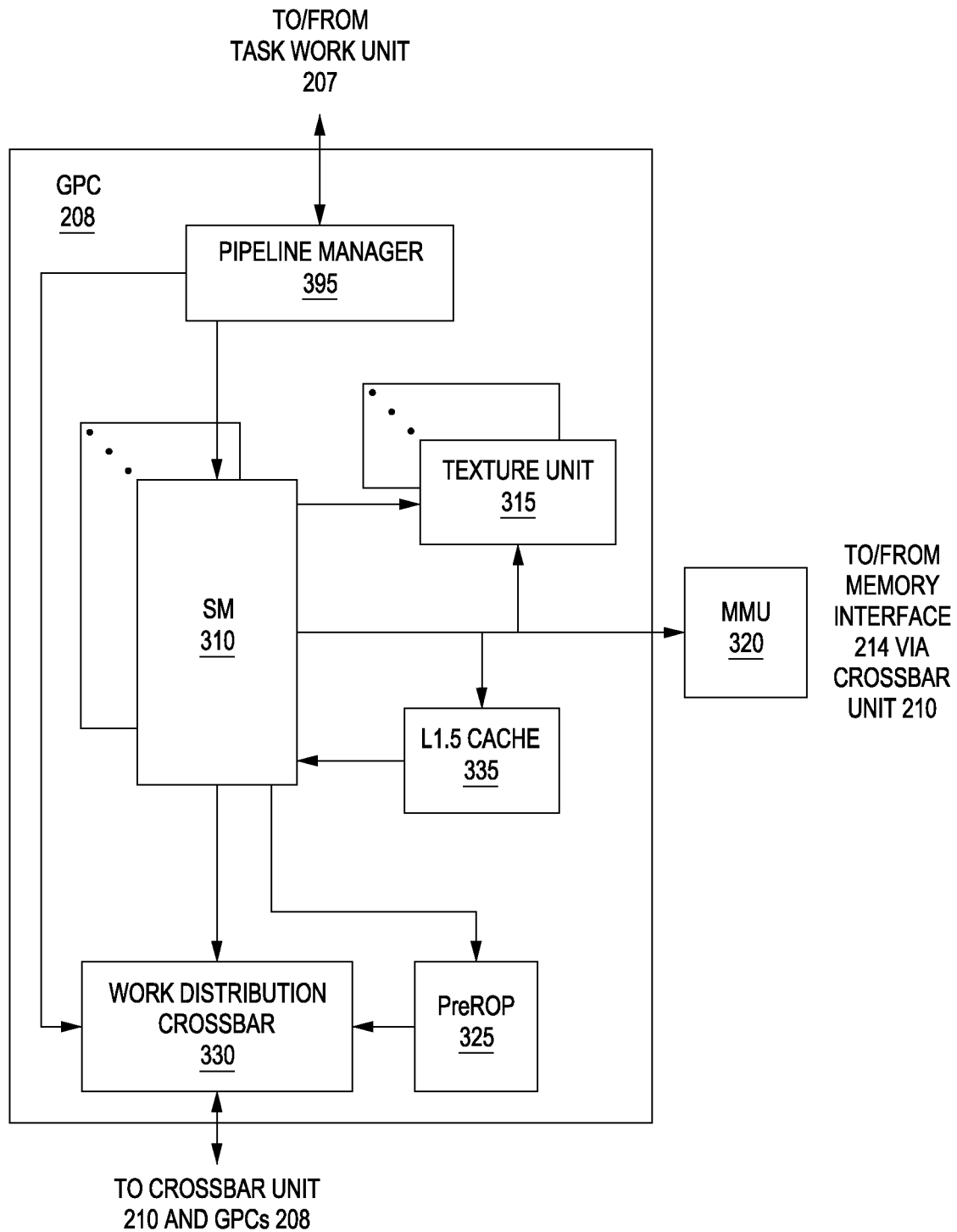
FIG. 3A is a block diagram of a general processing cluster included in the parallel processing unit of FIG. 2, according to various embodiments of the present invention.

FIG. 3A is a block diagram of a GPC 208 included in PPU 202 of FIG. 2, according to various embodiments of the present invention. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In one embodiment, GPC 208 includes a set of M of SMs 310, where M≥1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (AND, OR, XOR), bit-shifting, and computation of various algebraic functions (e.g., planar interpolation and trigonometric, exponential, and logarithmic functions, etc.). Advantageously, the same functional execution unit can be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310.

Although not shown in FIG. 3A, each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3A, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

Each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In graphics and compute applications, GPC 208 may be configured such that each SM 310 is coupled to a texture unit 315 for performing texture mapping operations, such as determining texture sample positions, reading texture data, and filtering texture data.

In operation, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the core architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3A in no way limits the scope of the present invention.

Figure 3B:
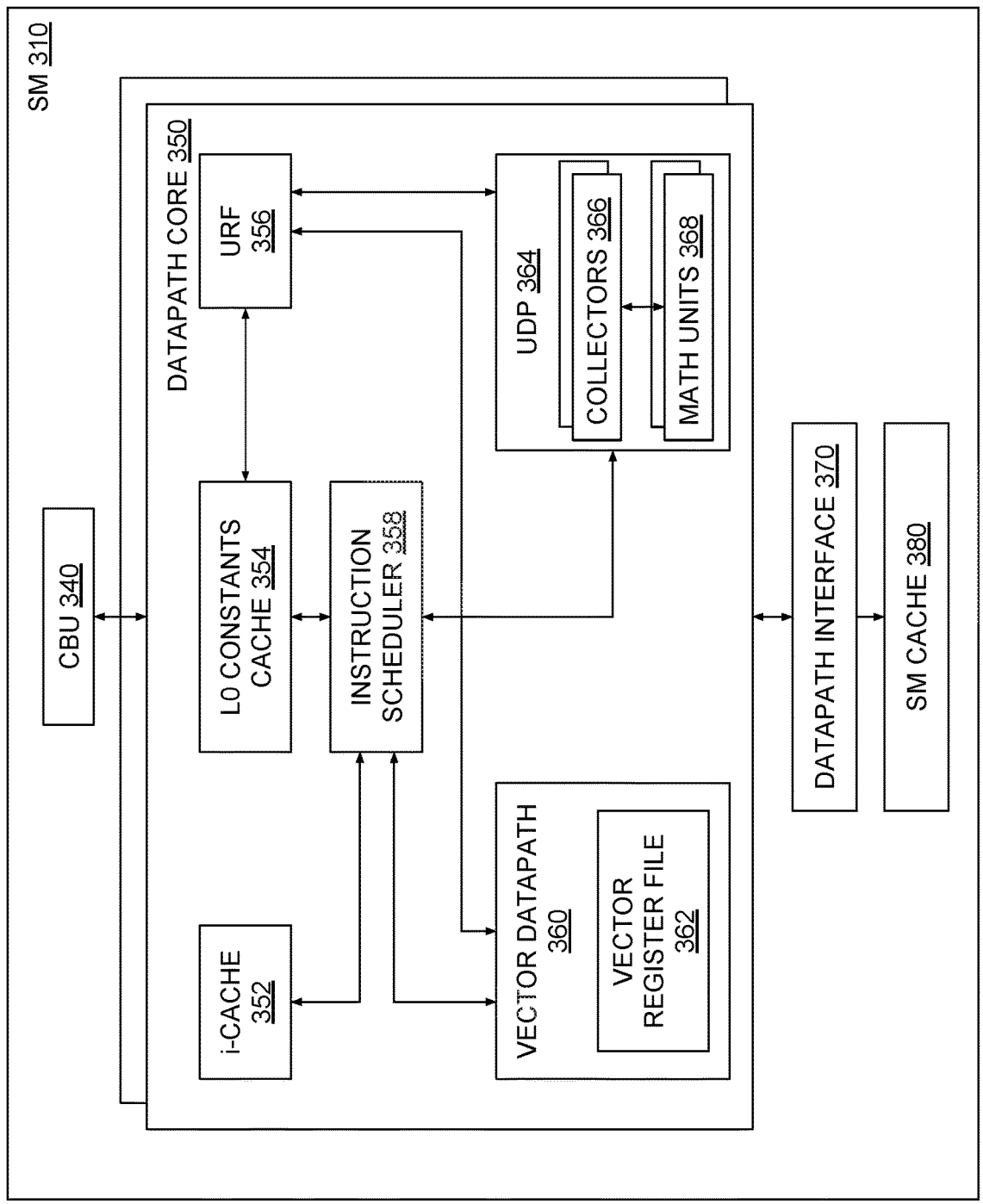
FIG. 3B is a more detailed illustration of the streaming multiprocessor of FIG. 3A, according to various embodiments of the present invention.

FIG. 3B is a more detailed illustration of the streaming multiprocessor (SM) of FIG. 3A, according to various embodiments of the present invention. As shown, SM 310 includes a convergence barrier unit (CBU) 340 coupled to one or more datapath cores 350. Each datapath core 350 is coupled downstream to a datapath interface 370 that, in turn, is coupled to an SM cache 380. SM cache 380 could be, for example, L1.5 cache 335 of FIG. 3A.

Each data path core 350 is configured to execute instructions associated with threads included in a thread group or warp. A given datapath core 350 includes an instruction cache (I-cache) 352, a level-zero (L0) constants cache 354, a uniform register file (URF) 356, an instruction scheduler 358, a vector datapath (VDP) 360 that includes a vector register file (VRF) 362, and a uniform datapath (UDP) 364 that includes collectors 366 and math units 368. Instruction cache 352 caches instructions to be executed by threads in one or more thread groups and/or instruction-oriented data. L0 constants cache 354 caches recently used constant values for expedited access. URF 356 is a shared memory resource configured to include uniform registers (URs) that can be accessed independently by threads within a given thread group. Instruction scheduler 358 schedules cached instructions for execution. Instruction scheduler 358 may schedule each thread included in a thread group for execution independently of other threads in the thread group, thereby preserving a common programming paradigm where threads are considered independent entities.

VDP 360 includes various units involved with the execution of vector-oriented instructions. Those units may include execution units, load/store units, and so forth. Vector register file 362 is configured to store data processed by groups of threads executing within VDP 360. Instructions executed via VDP 360 may be divergent in nature. UDP 364 includes various units involved with the execution of uniform instructions, including collectors 366 and math units 368. In the context of this disclosure, "uniform" instructions refer to those instructions which generally follow an identical or similar control path and process the same or closely related data. Units within UDP 364 may access URF 366 during execution.

In operation, VDP 360 and UDP 364 operate in conjunction with one another to execute program instructions compiled via driver 103. Those program instructions may be parsed during compilation into "cohesive blocks" of instructions that do not include instructions which diverge or reconverge. Other program instructions that do include instructions which diverge or reconverge may delimit these cohesive blocks of instructions. VDP 360 may execute divergent/convergent instructions, while UDP 364 may execute cohesive blocks of instructions. Each cohesive block may be allocated a specific UR within URF 356. A group of threads configured to execute the cohesive block may access the allocated UR during execution. Further, each thread in the group of threads is afforded independent access to the UR. URs may be used to store various data associated with constant values, including virtual addresses of constant values, pointers to constant values, data structures that define the location(s) of constant values, and constant values themselves.

In one embodiment, when UDP 364 executes a cohesive block, collectors 366 initially collect input data for that cohesive block from the associated UR. The data may also be cached local to URF 356 (e.g. in L0 constants cache 354, among other places). Each collector 366 then provides the collected input data to math units 368. Math units 368 may then perform various processing operations with the input data on behalf of associated threads. Accordingly, when any given thread in the thread group executes instructions associated with the cohesive block, each such thread has independent access to the input data collected from the UR. This technique can be leveraged to traverse a chain of pointers that describes the location of a constant value. As described in greater detail below, multiple different URs can store different pointers in a chain of pointers, ultimately leading to a location where a constant value is stored. One or more threads in the group of threads can traverse this chain to access the constant value. This approach is described in greater detail below in conjunction with FIGS. 4-7.

Binding Constants at Runtime

Figure 4:
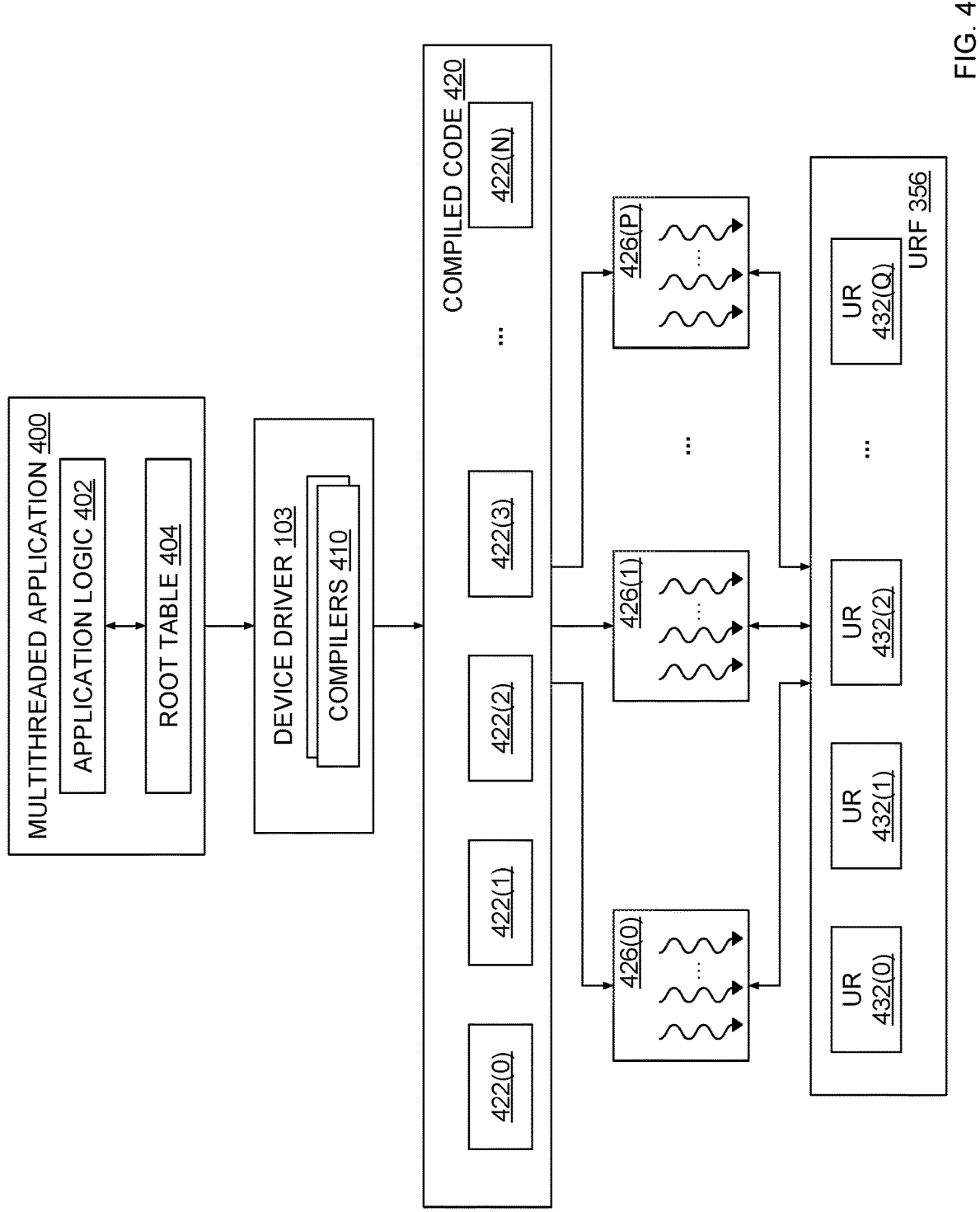
FIG. 4 illustrates how uniform registers are allocated to groups of threads for executing blocks of instructions, according to various embodiments of the present invention.

FIG. 4 illustrates how uniform registers are allocated to groups of threads for executing blocks of instructions, according to various embodiments of the present invention. As shown, multithreaded application 400 includes application logic 402 and root table 404. Device driver 103 includes one or more compilers 410. Compiled code 420 includes code blocks 422. URF 356 includes uniform registers (URs) 432.

Multithreaded application 400 may be any technically feasible type of application, including a graphics-specific multithreaded application or a generic parallel processing application, among others. Application logic 402 includes program code defining the overarching functionality of multithreaded application 400. In graphics applications, application logic 402 may describe a graphics scene. Root table 404 is a data structure that describes chains of pointers indicating the locations of various data, including constant values referenced by application logic 402.

Compilers 410 generally include a hierarchy of compilers. A given compiler in the hierarchy translates received instructions into intermediate instructions for further compilation by a subsequent compiler in the hierarchy. Compilers 410 may also include various hardware specific compilers that generate different types of machine code corresponding to specific underlying processor hardware. For example, a first compiler 410 could compile multithreaded application 400 to generate parallel thread execution (PTX) code, and then a second compiler 410 could compile the PTX code to generate machine specific code, including machine executable binaries. Persons skilled in the art will understand that many compilation paradigms can be applied without departing from the overall scope of the present disclosure. As a general matter, compilers 410 interoperate to generate code blocks 422 included in compiled code 420.

In one embodiment, a given code block 422 may only include instructions that do not cause divergence or convergence, referred to above as "cohesive blocks." A thread group 426 may execute the given code block 422 and, in doing so, access one or more URs 432 allocated for execution of that code block. Each thread in the thread group may access a given value stored in the one or more URs 432 independently of other threads in the thread group. Accordingly, multiple copies of that value need not be replicated to support execution of the thread group.

Compilers 410 include a just-in-time (JIT) compiler (shown in FIG. 6) that generates and/or modifies, at runtime, specific code blocks 422 within compiled code 420 that reference constant values. In doing so, the JIT compiler performs a sequence of operations to bind a given constant referenced in multithreaded application 400 to a value stored at a specific memory region. To bind a constant in this manner, the JIT compiler introduces additional instructions into a code block 422. When these instructions are executed by one or more threads in a thread group 426, those threads may traverse a chain of pointers to retrieve and/or access the constant value. The chain of pointers originates within root table 404 and terminates at the constant value. In some cases, L0 constants cache 354 caches constants specified by a given chain of pointers, thus expediting access to those constants. The structure of root table 404 is described in greater detail below in conjunction with FIG. 5. An example of how JIT compiler generates instructions for traversing a pointer chain is described in greater detail below in conjunction with FIG. 6.

Figure 5:
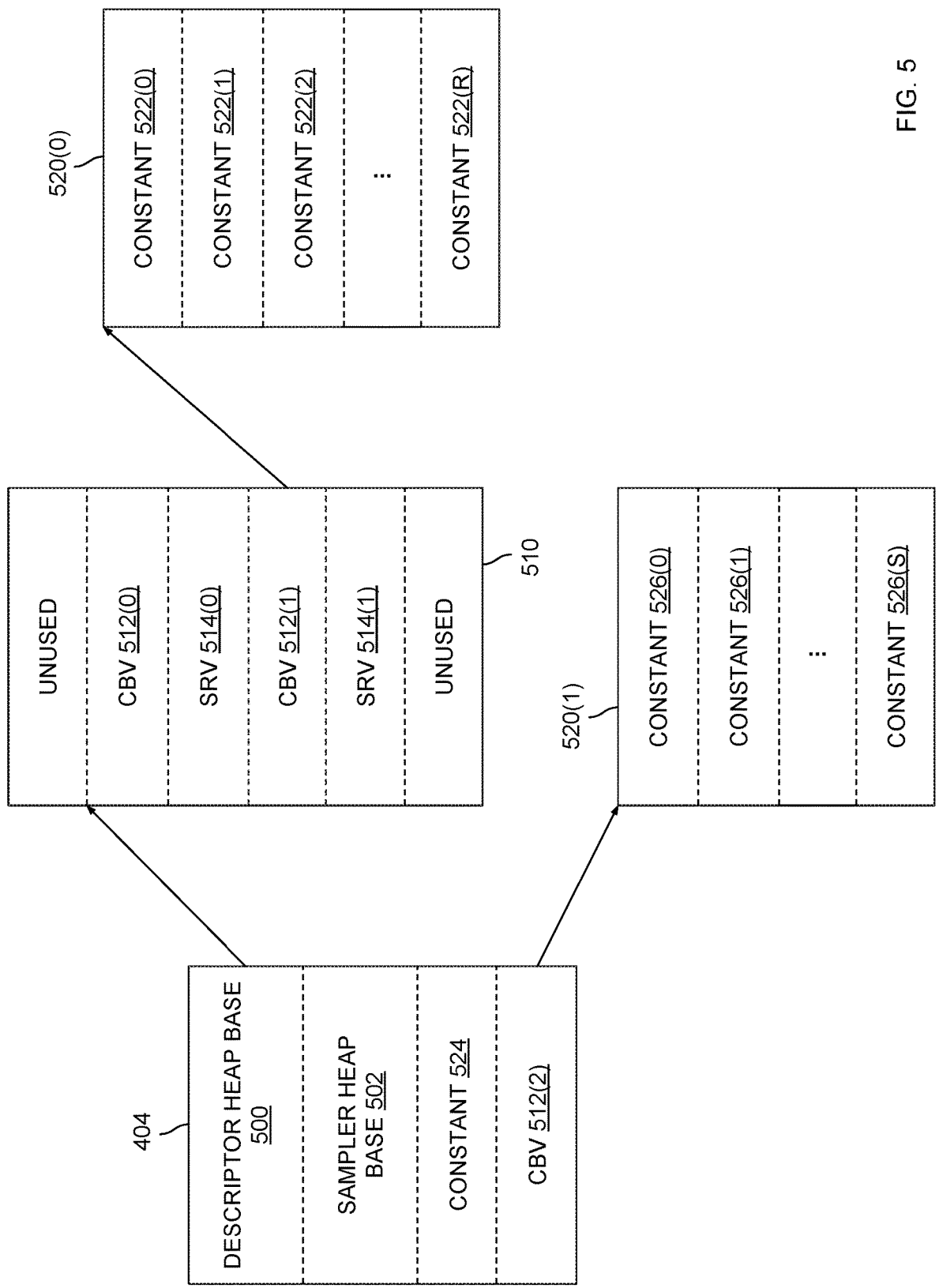
FIG. 5 illustrates how the root table of FIG. 4 references a constant via a chain of pointers, according to various embodiments of the present invention.

FIG. 5 illustrates how the root table of FIG. 4 references a constant via a chain of pointers, according to various embodiments of the present invention. As shown, root table 404 includes a descriptor heap base 500 and a sampler heap base 502. Descriptor heap base 500 points to descriptor heap 510. Descriptor heap 510 includes constant buffer views (CBVs) 512 and sampler resource views (SRVs) 514. A given CBV 512 points to a constant buffer 520 that includes a set of constants. As shown, CBV 512(1) points to constant buffer 520(0) that includes constants 522. Root table 404 thus describes a chain of pointers that originates within root table 404 and terminates at a specific constant via several levels of indirection. This particular chain of pointers relies on descriptor heap 510 as an intermediary. Root table 404 may also include CBVs and/or constants directly. As shown, root table 404 includes constant 524 and CBV 512(2). CBV 512(2) points to constant buffer 520(1) that includes constants 526. The pointer chain associated with CBV 512(2) includes just one level of indirection. No indirection is needed to access constants stored directly in root table 404.

Figure 6:
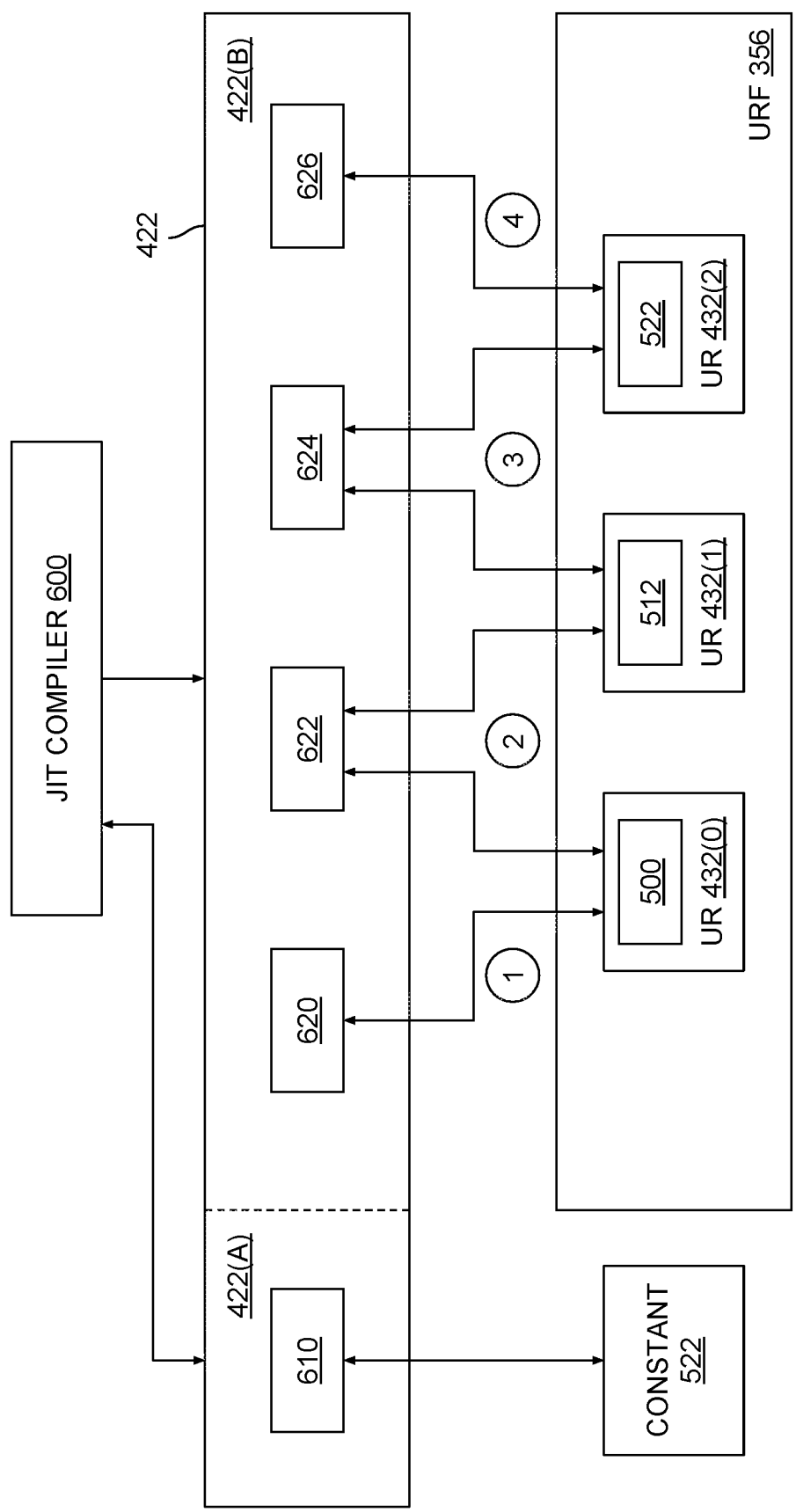
FIG. 6 illustrates how the compilers of FIG. 4 generate instructions for traversing a chain of pointers, according to various embodiments of the present invention.

The structure of root table 404 is generally defined by the developer of multithreaded application 400. During JIT compilation of multithreaded application 400, the JIT compiler recognizes references to specific types of constants and then generates instructions for accessing those constants based on the structure of root table 404. For example, if multithreaded application 400 reference the zeroth constant in constant buffer 520(0), then the JIT compiler would generate instructions for loading descriptor heap base 500, accessing CBV 512(1), and ultimately retrieving constant 522(0). Generally, only one thread within a thread group 426 traverses the chain of pointers to access the constant value. That one thread may copy the constant value into a UR 432, thereby binding the constant and providing each other thread in the same thread group with independent access to the associated value. A given constant may reside anywhere in memory and be bound at runtime in this manner. FIG. 6 sets forth an example of how a pointer chain is traversed to bind a constant.

FIG. 6 illustrates how the compilers of FIG. 4 generate instructions for traversing a chain of pointers, according to various embodiments of the present invention. As shown, a code block 422 includes an initial portion 422(A) and an expanded portion 422(B). JIT compiler 600 parses code block 422 and determines that initial portion 422(A) includes an instruction 610 that references a constant 522. Instruction 610 may include a special flag that serves as a compiler hint for JIT compiler 600. The flag may indicate that instruction 610 is a "uniform" instruction for which space within a URF 356 can be allocated and for which additional instructions may be generated. Many types of uniform instructions may be included in multithreaded application 400. Each uniform instruction may access resources afforded by URF 356 and/or UDP 364. JIT compiler 600 parses instruction 610 and determines that additional instructions are needed to bind constant 522 to a location in URF 356 at runtime. JIT compiler 600 then generates instructions 620, 622, 624, and 626 to be executed by one or more threads within a specific thread group 426.

A first thread in the thread group 426 executes instruction 620 to load descriptor heap base 500 into UR 432(0), shown as operation (1). Then, the first thread executes instruction 622 with descriptor heap base 500 to load a CBV 512 into UR 432(1), shown as operation (2). The first thread then executes instruction 624 with CBV 512 to load constant 522 into UR 432 (shown as operation (3)), thereby binding that constant to a particular memory location. Some or all threads in the thread group 426 may then execute instruction 626 with constant 522 stored in UR 432(2), shown as operation (4). Instruction 626 may be derived directly from instruction 610. In some situations, threads other than the first thread may execute any of the instructions discussed above. Because URs 432 provide each thread within the thread group with independent access to data stored therein, each thread may access constant 522 independently without needing that replicate that constant for each thread. Further, each thread may access other constant values beyond constant 522 based on intermediate results stored in URs 432. For example, a thread could access one or more additional constants indicated by CBV 512 by accessing that CBV with one or more different offsets. In general, any portion of a pointer chain already stored in URs 432 can be re-used from those URs 432 when traversing that pointer chain.

JIT compiler 600 may also generate other sequences of instructions to expand a given instruction 422 depending on the structure of root table 404. For example, in situations where root table includes a CBV 512, as is shown in FIG. 5, JIT compiler 600 need not generate an instruction to load descriptor heap base 500. Instead, JIT compiler 600 generates an instruction to load CBV 512 and then load the referenced constant. As a general matter, JIT compiler 600 generates a number of additional instructions for accessing constants that depends on the number of pointers to traverse when accessing the constant. In conjunction with the techniques described thus far, conventional approaches to specifying constants may also be applied. For example, a given code block 422 may include a reference to a constant included in a conventional constant bank. JIT compiler 600 need not generate additional instructions in these situations. In one embodiment, root table 404 may be bound within a conventional constant bank. Various constants may then be accessed by traversing pointer chains specified in root table 404 after accessing that constant bank.

In some situations, instruction 610 may reference a specific UR 432 that already includes constant 522. A previous instruction within a code block 422 may populate that particular UR 432 with the constant. In such cases, JIT compiler 600 need not generate additional instructions, as each thread in the thread group already has access to that UR 432. A given instruction may also alter the value of a constant stored in a UR 432 to prepare for a subsequent instruction. For example, a first instruction could reference a first UR 432 that stores a first constant, and a subsequent instruction could also reference the first UR 432. A second instruction following the first instruction could update the contents of the first UR 432 to include a second constant, thereby preparing the first UR 432 for subsequent access by the subsequent instruction. This technique allows multiple instructions to reference the same memory location, yet provide those different instructions with access to different constant values.

In other situations, instruction 610 references a specific UR 432 that includes a virtual address of a constant. The virtual address could reference any portion of memory. JIT compiler 600 may generate one or more additional instructions for resolving the virtual address and loading the constant into URF 356. A given instruction may also alter the value of the virtual address stored within a UR 432 to indicate a different memory location associated with a different constant. Similar to the technique described above, this approach also allows multiple instructions to reference the same memory location yet provide those different instructions with access to different constant values via different virtual addresses.

Referring generally to FIGS. 1-6, the techniques discussed thus far allow multithreaded application 400 to access a number of constant values that is only limited by the total memory available to the application. Importantly, multithreaded application 400 may reference numerous constants, but the values of these constants need not be bound to specific memory locations until runtime. At runtime, JIT compiler 600 performs the techniques described thus far to bind constants from any memory location into URs 432, thereby providing thread groups 426 with access to the actual values of those constants.

Figure 7:
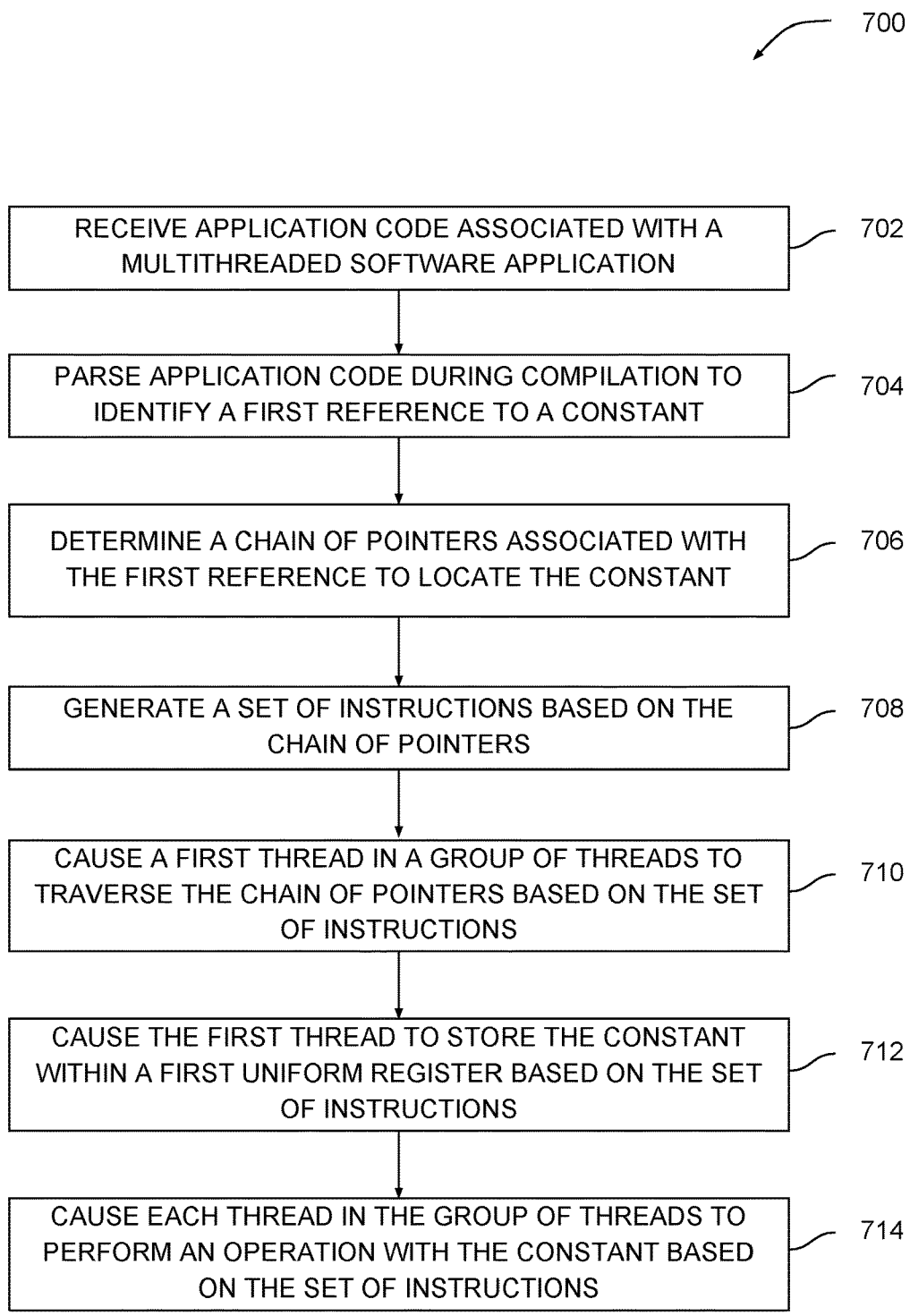
FIG. 7 is a flow diagram of method steps for binding a constant at runtime, according to various embodiments of the present invention.

FIG. 7 is a flow diagram of method steps for binding a constant at runtime, according to various embodiments of the present invention. Although the method steps are described in conjunction with the system of FIGS. 1-6, persons skilled in the art will understand that any system configured to perform the method steps, in any order, falls within the scope of the present invention.

As shown, a method 700 begins at step 702, where device driver 103 of FIGS. 1 and 4 receives application code associated with multithreaded application 400 shown in FIG. 4. At step 704, JIT compiler 600 within device driver 103 parses application code during compilation to identify a first reference to a constant value. The reference to the constant value may include a compiler hint indicating that JIT compiler 600 may need to introduce additional instructions to access the constant. At step 706, JIT compiler 600 determines a chain of pointers associated with the first reference to locate the constant value. The chain of pointers is generally derived from the structure of root table 404. At step 708, JIT compiler 600 generates a set of instructions based on the chain of pointers. For example, JIT compiler 600 could generate instructions 620, 622, 624, and 626 included in expanded portion of code block 422 shown in FIG. 6.

At step 710, device driver 103 dispatches a first thread in a group of threads to traverse the chain of pointers based on the set of instructions. In doing so, the first pointer may load one or more intermediate pointers into various URs 432. At step 712, device driver 103 causes the first thread to store the constant value within a first uniform register based on the set of instructions. Each thread in a group of threads that includes the first thread may access the constant value via the first uniform register. At step 714, device driver 103 causes each thread in the group of threads to perform an operation with the constant value based on the set of instructions.

In sum, a just-in-time (JIT) compiler binds constants to specific memory locations at runtime. The JIT compiler parses program code derived from a multithreaded application and identifies an instruction that references a uniform constant. The JIT compiler then determines a chain of pointers that originates within a root table specified in the multithreaded application and terminates at the uniform constant. The JIT compiler generates additional instructions for traversing the chain of pointers and inserts these instructions into the program code. A parallel processor executes this compiled code and, in doing so, causes a thread to traverse the chain of pointers and bind the uniform constant to a uniform register at runtime. Each thread in a group of threads executing on the parallel processor may then access the uniform constant.

One advantage of the disclosed approach is that the multithreaded application may reference a number of constant values that is not limited by the storage capacity of dedicated constant banks. Accordingly, a parallel processor that implements this approach may be fully compliant with Tier 3 of the DX12 API. Because compliance with industry standard APIs is critical to the success of a parallel processor, the approach described herein represents a significant technological improvement over conventional techniques that cannot achieve such compliance.

Any and all combinations of any of the claim elements recited in any of the claims and/or any elements described in this application, in any fashion, fall within the contemplated scope of the present embodiments and protection.

1. Some embodiments include computer-implemented method for binding constants, the method comprising: determining a first pointer chain based on a first instruction included in a multithreaded application, wherein the first pointer chain indicates a first memory location associated with a first constant, generating a set of additional instructions based on the first pointer chain, causing a first thread included in a first set of threads to execute the set of additional instructions, wherein the first thread copies the first constant to a second memory location when executing the set of additional instructions, and causing each thread included in the first set of threads to execute a second instruction, wherein each thread included in the first set of threads performs a first operation using the first constant when executing the second instruction.

2. The computer-implemented method of clause 1, wherein determining the first pointer chain comprises: determining a first pointer based on a root table associated with the multithreaded application, wherein the first pointer indicates a descriptor heap base address, and determining a second pointer based on the first pointer, wherein the second pointer indicates a memory region that includes the first memory location.

3. The computer-implemented method of any of clauses 1 and 2, wherein determining the first pointer chain comprises determining a first pointer based on a root table associated with the multithreaded application, and wherein the first pointer indicates a memory region that includes the first memory location.

4. The computer-implemented method of any of clauses 1, 2, and 3, further comprising: determining that a third instruction included in the multithreaded application indicates a second constant stored in a root table associated with the multithreaded application, and causing each thread included in the first set of threads to access the second constant within the root table.

5. The computer-implemented method of any of clauses 1, 2, 3, and 4, wherein the set of additional instructions is generated while at least a portion of the multithreaded application is executed, and wherein the first thread executes the set of additional instructions while at least a portion of the multithreaded application is executed.

6. The computer-implemented method of any of clauses 1, 2, 3, 4, and 5, further comprising generating the second instruction based on the first pointer chain, wherein the second instruction is generated while at least a portion of the multithreaded application is executed, and wherein each thread in the first set of threads executes the second instruction while at least a portion of the multithreaded application is executed.

7. The computer-implemented method of any of clauses 1, 2, 3, 4, 5, and 6, further comprising: causing a scheduler to schedule the first thread to execute the second instruction, and causing the scheduler to schedule a second thread included in the first set of threads to execute the second instruction, wherein the first thread is scheduled independently of the second thread.

8. The computer-implemented method of any of clauses 1, 2, 3, 4, 5, 6, and 7, wherein the first pointer chain includes a first virtual address corresponding to the first memory location, and further comprising: generating a third instruction based on the first virtual address, and causing the first thread to execute the third instruction, wherein executing the third instruction causes the first thread to modify the first virtual address to correspond to a second memory location associated with a second constant.

9. The computer-implemented method of any of clauses 1, 2, 3, 4, 5, 6, 7, and 8, wherein the first constant comprises a value of a material property associated with a material included in a graphics scene defined by the multithreaded application.

10. Some embodiments include a non-transitory computer-readable medium storing program instructions that, when executed by a processor, cause the processor to bind constants by performing the steps of: determining a first pointer chain based on a first instruction included in a multithreaded application, wherein the first pointer chain indicates a first memory location associated with a first constant, generating a set of additional instructions based on the first pointer chain, causing a first thread included in a first set of threads to execute the set of additional instructions, wherein the first thread copies the first constant to a second memory location when executing the set of additional instructions, and causing each thread included in the first set of threads to execute a second instruction, wherein each thread included in the first set of threads performs a first operation using the first constant when executing the second instruction.

11. The non-transitory computer-readable medium of clause 10, wherein the step of determining the first pointer chain comprises: determining a first pointer based on a root table associated with the multithreaded application, wherein the first pointer indicates a descriptor heap base address, and determining a second pointer based on the first pointer, wherein the second pointer indicates a memory region that includes the first memory location.

12. The non-transitory computer-readable medium of any of clauses 10 and 11, wherein the step of determining the first pointer chain comprises determining a first pointer based on a root table associated with the multithreaded application, and wherein the first pointer indicates a memory region that includes the first memory location.

13. The non-transitory computer-readable medium of any of clauses 10, 11, and 12, further comprising the steps of: determining that a third instruction included in the multithreaded application indicates a second constant stored in a root table associated with the multithreaded application, and causing each thread included in the first set of threads to access the second constant within the root table.

14. The non-transitory computer-readable medium of any of clauses 10, 11, 12, and 13, further comprising the steps of: causing a scheduler to schedule the first thread to execute the second instruction, and causing the scheduler to schedule a second thread included in the first set of threads to execute the second instruction, wherein the first thread is scheduled independently of the second thread.

15. The non-transitory computer-readable medium of any of clauses 10, 11, 12, 13, and 14, wherein the first pointer chain includes a first virtual address corresponding to the first memory location, and further comprising the steps of: generating a third instruction based on the first virtual address, and causing the first thread to execute the third instruction, wherein executing the third instruction causes the first thread to modify the first virtual address to correspond to a second memory location associated with a second constant.

16. The non-transitory computer-readable medium of any of clauses 10, 11, 12, 13, 14, and 15, wherein the first thread accesses the first constant when performing the first operation at least partially in parallel with the second thread accessing the first constant when performing the first operation.

17. The non-transitory computer-readable medium of any of clauses 10, 11, 12, 13, 14, 15, and 16, wherein the first thread stores at least a portion of the first pointer chain in a first uniform register included in a first register file, and wherein the second memory location resides within a second uniform register included in the first register file.

18. Some embodiments include a system for binding constants, comprising: a memory storing a device driver, and a processor that, when executing the device driver, is configured to perform the steps of: determining a first pointer chain based on a first instruction included in a multithreaded application, wherein the first pointer chain indicates a first memory location associated with a first constant, generating a set of additional instructions based on the first pointer chain, causing a first thread included in a first set of threads to execute the set of additional instructions, wherein the first thread copies the first constant to a second memory location when executing the set of additional instructions, and causing each thread included in the first set of threads to execute a second instruction, wherein each thread included in the first set of threads performs a first operation using the first constant when executing the second instruction.

19. The system of clause 18, further comprising: a first datapath that executes instructions that do not diverge and do not converge, a second datapath that executes instructions that diverge or converge, and a uniform register file coupled to the first datapath and to the second datapath, wherein each thread included in the first set of threads executes the second instruction via the second datapath.

20. The system of any of clauses 18 and 19, wherein the first memory location resides within the memory and the second memory location resides within the uniform register file, and wherein each thread included in the first set of threads accesses the second memory location independently of other threads included in the first set of threads.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. For example, the various embodiments described herein may be implemented in any type of graphics operation that involves constant values, such as ray tracing. However, the various embodiments may be implemented more broadly in any graphics system or graphics environment, in any cloud computing environment, within one or more server machines for purposes of gaming, graphics, video streaming, etc., or in any Vehicle Navigation, Infotainment or instrument cluster controller system (e.g., as found in Automobiles). The NVIDIA GeForce NOW® is an example of a networked gaming service that can leverage the various embodiments to enhance performance and the overall user experience.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for binding constants, the method comprising:
parsing program code included in a multithreaded application to identify a first instruction that references a first constant;
in response to identifying the first instruction that references the first constant, determining a first pointer chain that indicates a first memory location associated with the first constant;
generating a set of additional instructions based on the first pointer chain;

causing a first thread included in a first set of threads to execute the set of additional instructions, wherein the first thread copies the first constant to a second memory location when executing the set of additional instructions; and causing one or more other threads included in the first set of threads to execute a second instruction, wherein each of the one or more other threads performs a first operation to access the first constant at the second memory location when executing the second instruction.

2. The computer-implemented method of claim 1, wherein determining the first pointer chain comprises:
   determining a first pointer based on a root table associated with the multithreaded application, wherein the first pointer indicates a descriptor heap base address; and
   determining a second pointer based on the first pointer, wherein the second pointer indicates a memory region that includes the first memory location.

3. The computer-implemented method of claim 1, wherein determining the first pointer chain comprises determining a first pointer based on a root table associated with the multithreaded application, and wherein the first pointer indicates a memory region that includes the first memory location.

4. The computer-implemented method of claim 1, further comprising:
   determining that a third instruction included in the multithreaded application indicates a second constant stored in a root table associated with the multithreaded application; and
   causing each thread included in the first set of threads to access the second constant within the root table.

5. The computer-implemented method of claim 1, wherein the set of additional instructions is generated while at least a portion of the multithreaded application is executed, and wherein the first thread executes the set of additional instructions while at least a portion of the multithreaded application is executed.

6. The computer-implemented method of claim 1, further comprising generating the second instruction based on the first pointer chain, wherein the second instruction is generated while at least a portion of the multithreaded application is executed, and wherein each thread in the first set of threads executes the second instruction while at least a portion of the multithreaded application is executed.

7. The computer-implemented method of claim 1, further comprising:
   causing a scheduler to schedule the first thread to execute the second instruction; and
   causing the scheduler to schedule a second thread included in the first set of threads to execute the second instruction, wherein the first thread is scheduled independently of the second thread.

8. The computer-implemented method of claim 1, wherein the first pointer chain includes a first virtual address corresponding to the first memory location, and further comprising:
   generating a third instruction based on the first virtual address; and
   causing the first thread to execute the third instruction, wherein executing the third instruction causes the first thread to modify the first virtual address to correspond to the second memory location associated with the first constant.

9. The computer-implemented method of claim 1, wherein the first constant comprises a value of a material property associated with a material included in a graphics scene defined by the multithreaded application.

10. One or more non-transitory computer-readable media storing program instructions that, when executed by one or more processors, cause the one or more processors to bind constants by performing the steps of:
    parsing program code included in a multithreaded application to identify a first instruction that references a first constant;
    in response to identifying the first instruction that references the first constant, determining a first pointer chain that indicates a first memory location associated with the first constant;
    generating a set of additional instructions based on the first pointer chain;
    causing a first thread included in a first set of threads to execute the set of additional instructions, wherein the first thread copies the first constant to a second memory location when executing the set of additional instructions; and
    causing one or more other threads included in the first set of threads to execute a second instruction, wherein each of the one or more other threads performs a first operation to access the first constant at the second memory location when executing the second instruction.

11. The one or more non-transitory computer-readable media of claim 10, wherein the step of determining the first pointer chain comprises:
    determining a first pointer based on a root table associated with the multithreaded application, wherein the first pointer indicates a descriptor heap base address; and
    determining a second pointer based on the first pointer, wherein the second pointer indicates a memory region that includes the first memory location.

12. The one or more non-transitory computer-readable media of claim 10, wherein the step of determining the first pointer chain comprises determining a first pointer based on a root table associated with the multithreaded application, and wherein the first pointer indicates a memory region that includes the first memory location.

13. The one or more non-transitory computer-readable media of claim 10, further comprising the steps of:
    determining that a third instruction included in the multithreaded application indicates a second constant stored in a root table associated with the multithreaded application; and
    causing each thread included in the first set of threads to access the second constant within the root table.

14. The one or more non-transitory computer-readable media of claim 10, further comprising the steps of:
    causing a scheduler to schedule the first thread to execute the second instruction; and
    causing the scheduler to schedule a second thread included in the first set of threads to execute the second instruction, wherein the first thread is scheduled independently of the second thread.

15. The one or more non-transitory computer-readable media of claim 10, wherein the first pointer chain includes a first virtual address corresponding to the first memory location, and further comprising the steps of:
    generating a third instruction based on the first virtual address; and
    causing the first thread to execute the third instruction, wherein executing the third instruction causes the first thread to modify the first virtual address to correspond to the second memory location associated with the first constant.

16. The one or more non-transitory computer-readable media of claim 10, wherein the first thread accesses the first constant when performing the first operation at least partially in parallel with the second thread accessing the first constant when performing the first operation.

17. The one or more non-transitory computer-readable media of claim 10, wherein the first thread stores at least a portion of the first pointer chain in a first uniform register included in a first register file, and wherein the second memory location resides within a second uniform register included in the first register file.

18. A system for binding constants, comprising:
one or more memories storing a device driver; and
one or more processors that, when executing the device driver, are configured to perform the steps of:
parsing program code included in a multithreaded application to identify a first instruction that references a first constant;
in response to identifying the first instruction that references the first constant, determining a first pointer chain that indicates a first memory location associated with the first constant;
generating a set of additional instructions based on the first pointer chain;
causing a first thread included in a first set of threads to execute the set of additional instructions, wherein the first thread copies the first constant to a second memory location when executing the set of additional instructions; and
causing one or more other threads included in the first set of threads to execute a second instruction, wherein of the one or more other threads performs a first operation to access the first constant at the second memory location when executing the second instruction.

19. The system of claim 18, further comprising:
a first datapath that executes instructions that do not diverge and do not converge;
a second datapath that executes instructions that diverge or converge; and
a uniform register file coupled to the first datapath and to the second datapath, wherein each thread included in the first set of threads executes the second instruction via the second datapath.

20. The system of claim 19, wherein the first memory location resides within the memory and the second memory location resides within the uniform register file, and wherein each thread included in the first set of threads accesses the second memory location independently of other threads included in the first set of threads.

* * * * *